(12) United States Patent
Hong et al.

(10) Patent No.: US 10,616,871 B2
(45) Date of Patent: Apr. 7, 2020

(54) UPLINK DATA PROCESSING METHOD AND APPARATUS THEREFOR

(71) Applicant: KT CORPORATION, Gyeonggi-do (KR)

(72) Inventors: Sung-pyo Hong, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/087,629

(22) PCT Filed: Mar. 13, 2017

(86) PCT No.: PCT/KR2017/002671
§ 371 (c)(1),
(2) Date: Sep. 21, 2018

(87) PCT Pub. No.: WO2017/164553
PCT Pub. Date: Sep. 28, 2017

(65) Prior Publication Data
US 2019/0098621 A1  Mar. 28, 2019

(30) Foreign Application Priority Data

Mar. 24, 2016 (KR) ........................ 10-2016-0035582
Mar. 24, 2016 (KR) ........................ 10-2016-0035584
Mar. 8, 2017 (KR) ........................ 10-2017-0029486

(51) Int. Cl.
*H04W 72/04* (2009.01)
*H04W 72/12* (2009.01)
(Continued)

(52) U.S. Cl.
CPC ....... *H04W 72/0413* (2013.01); *H04W 28/08* (2013.01); *H04W 72/042* (2013.01);
(Continued)

(58) Field of Classification Search
None
See application file for complete search history.

(56) References Cited

U.S. PATENT DOCUMENTS

2014/0293970 A1  10/2014  Damnjanovic et al.
2015/0181589 A1   6/2015  Luo et al.
(Continued)

OTHER PUBLICATIONS

Ericsson, "LWA bearer reconfiguration procedures", R2-161547, 3GPP TSG-RAN WG2 #93, Malta, Feb. 15-19, 2016.
Intel Corporation et al., "New Work Item on Enhanced LWA", RP-160600, 3GPP TSG RAN Meeting #71, Goeteborg, Sweden, Mar. 7-10, 2016.
(Continued)

*Primary Examiner* — Christine T Duong
(74) *Attorney, Agent, or Firm* — IP Legal Services, LLC

(57) ABSTRACT

Provided are a method and an apparatus for processing uplink data. In particular, a method of a terminal for processing uplink data may include receiving configuration information for indicating uplink transmission configuration for an LTE-WLAN Aggregation (LWA) bearer from a base station; determining an uplink transmission path for the LWA bearer based on the configuration information and a transmittable data amount; and transmitting uplink data to the base station through the determined uplink transmission path, wherein the LWA bearer is a bearer configured to transmit the uplink data using at least one of a base station radio resource and a Wireless Local Area Network (WLAN) radio resource.

14 Claims, 9 Drawing Sheets

(51) Int. Cl.
*H04W 76/15* (2018.01)
*H04W 28/08* (2009.01)
*H04W 84/12* (2009.01)
*H04W 88/10* (2009.01)

(52) U.S. Cl.
CPC ....... *H04W 72/1284* (2013.01); *H04W 76/15* (2018.02); *H04W 84/12* (2013.01); *H04W 88/10* (2013.01)

(56) References Cited

U.S. PATENT DOCUMENTS

| | | | |
|---|---|---|---|
| 2016/0234726 A1* | 8/2016 | Nuggehalli | H04W 36/0022 |
| 2018/0206282 A1* | 7/2018 | Singh | H04W 88/06 |
| 2019/0297524 A1* | 9/2019 | Yi | H04B 1/707 |

OTHER PUBLICATIONS

Samsung, "LWA DRB reconfiguration, RRC PDU and procedural aspects", R2-161223, 3GPP TSG-RAN2#93 meeting, St Julian's, Malta, Feb. 15-19, 2016.

Mediatek Inc., "Network Selection and Data Aggregation with LTE-WLAN Aggregation", R2-151681, 3GPP TSG-RAN2#89BIS meeting, Bratislava, Slovakia, Apr. 20-24, 2015, pp. 1-3.

Qualcomm Incorporated, "UE Measurements of WLAN for LWA and Interworking Enhancement", R2-153821, 3GPP TSG-RAN WG2 Meeting #91, Beijing, China, Aug. 24-28, 2015, pp. 1-3.

ZTE, "Consideration on WLAN measurement for the LTE/WLAN aggregation and interworking enhancement", R2-153384, 3GPP TSG-RAN WG2 meeting #91, Beijing, China, Aug. 24-28, 2015, pp. 1-8.

* cited by examiner

FIG.3

UE-EUTRA-Capability information element

```
LWA-Parameters-r13 ::=    SEQUENCE {
    lwa-r13               ENUMERATED {supported}    OPTIONAL,
    lwa-SplitBearer-r13   ENUMERATED {supported}    OPTIONAL,
    ...
}
```

UPLINK DATA PROCESSING METHOD AND APPARATUS THEREFOR

CROSS REFERENCE TO RELATED APPLICATIONS

This application is a National Stage Patent Application of PCT International Patent Application No. PCT/KR2017/002671 (filed on Mar. 13, 2017) under 35 U.S.C. § 371, which claims priority to Korean Patent Application Nos. 10-2016-0035582 (filed on Mar. 24, 2016), 10-2016-0035584 (filed on Mar. 24, 2016), and 10-2017-0029486 (filed on Mar. 8, 2017), the teachings of which are incorporated herein in their entireties by reference.

TECHNICAL FIELD

An embodiment relates to a method and apparatus for enabling a terminal to process uplink data. The present disclosure relates to a method and apparatus for processing uplink data through a base station radio resource or a wireless local area network (WLAN) radio resource in a long term evolution (LTE)-WLAN aggregation (LWA) framework using a base station radio resource or a WLAN radio resource.

BACKGROUND ART

Due to advances in communication systems, various wireless terminals have introduced to customers such as companies and individuals. Mobile communication systems have employed technologies related to $3^{rd}$ generation partnership project (3GPP)-series Long Term Evolution (LTE) and LTE-Advanced systems. Such mobile communication systems are capable of transmitting a large amount of data at a high speed. In order for transmitting a large amount of data at a high speed, data may be efficiently transmitted using several cells.

However, there is a limit in transmitting a large amount of data to several terminals from a base station using limited frequency resources. For example, specific service providers have occupied predetermined frequency resources exclusively. Accordingly, it is difficult and very expensive to secure frequency resources.

Unlike licensed spectrum that is exclusively occupied by a specific service provider, unlicensed spectrum band can be shared. For example, Wireless Local Area Network (WLAN) technology is representative of WiFi, and such WLAN provides a data transmission/reception service using a frequency resource of unlicensed spectrum bands.

Accordingly, there is a need for a method for enabling a mobile communication system to transmit/receive data to/from a terminal using WLAN Access Point (AP). In particular, no detailed procedure and method have introduced for enabling the base station to transmit data to and receive data from a terminal using a WLAN radio resource (e.g., WLAN carrier) and a base station radio resource (e.g., base station carrier). Accordingly, there is a need for a detailed method of setting a detailed uplink data transmission path and setting and transmitting buffer setting information of a terminal for a radio bearer, in which a terminal is set to transmit uplink data, using a WLAN radio resource and a base station radio resource.

DETAILED DESCRIPTION OF THE INVENTION

Technical Problem

In accordance with an embodiment, a method may be provided for enabling a terminal to process uplink data using a base station and a WLAN radio resource.

In accordance with another embodiment, methods may be provided for determining an uplink data transmission path of an LTE-WLAN Aggregation (LWA) bearer in which a terminal is set to process uplink data using a base station and a WLAN radio resource and for accurately transmitting a buffer status of a terminal to a base station.

Technical Solution

In accordance with an embodiment, a method may be provided for processing uplink data by a terminal. The method may include: receiving configuration information indicating uplink transmission configuration for an LTE-WLAN Aggregation (LWA) bearer from a base station; determining an uplink transmission path for the LWA bearer based on the configuration information and a transmittable data amount; and transmitting uplink data to the base station through the determined uplink transmission path, in which the LWA bearer is a bearer configured to transmit the uplink data using at least one of a base station radio resource and a Wireless Local Area Network (WLAN) radio resource.

In accordance with another embodiment, a method may be provided for receiving uplink data by means of a base station. The method may include: transmitting configuration information for indicating uplink transmission configuration for an LTE-WLAN Aggregation (LWA) bearer to a terminal; and receiving uplink data through an uplink transmission information for the LWA bearer determined on the basis of the configuration information and an uplink transmittable data amount of the terminal, in which the configuration information includes at least one of path instruction information for indicating an uplink transmission path of the LWA bearer and a threshold value, and the LWA bearer is a bearer configured to receive the uplink data using at least one of a base station radio resource and a Wireless Local Area Network (WLAN) radio resource.

In accordance with further another embodiment, a terminal may be provided for processing uplink data. The terminal may include: a receiver configured to receive configuration information for indicating uplink transmission configuration for an LTE-WLAN Aggregation (LWA) bearer from a base station; a controller configured to determine an uplink transmission path for the LWA bearer on the basis of the configuration information and a transmittable data amount; and a transmitter configured to transmit uplink data to the base station through the determined uplink transmission path, in which the LWA bearer is a bearer configured to transmit the uplink data using at least one of a base station radio resource and a Wireless Local Area Network (WLAN) radio resource.

In accordance with still another embodiment, a base station may be provided for receiving uplink data. The base station may include: a transmitter configured to transmit configuration information for indicating uplink transmission configuration for an LTE-WLAN Aggregation (LWA) bearer to a terminal; and a receiver configured to receive uplink data through an uplink transmission information for the LWA bearer determined on the basis of the configuration information and an uplink transmittable data amount of the terminal, in which the configuration information includes at least one of path instruction information for indicating an uplink transmission path of the LWA bearer and a threshold value, and the LWA bearer is a bearer configured to receive the uplink data using at least one of a base station radio resource and a Wireless Local Area Network (WLAN) radio resource.

Advantageous Effects

According to the embodiments, a terminal may transmits uplink data of an LWA bearer set to use a base station and a WLAN radio resource to the base station in accordance with situations.

Further, the terminal may prevent unnecessary waste of base station radio resources and appropriately determine a transmission path for uplink data transmission by transmitting a buffer status except for uplink data, which is transmitted through a WLAN radio resource, to the base station.

BRIEF DESCRIPTION OF THE DRAWINGS

FIG. 3 is a diagram exemplarily showing LWA UE-EUTRA-Capability information elements and field;

MODE FOR CARRYING OUT THE INVENTION

Figure 1:
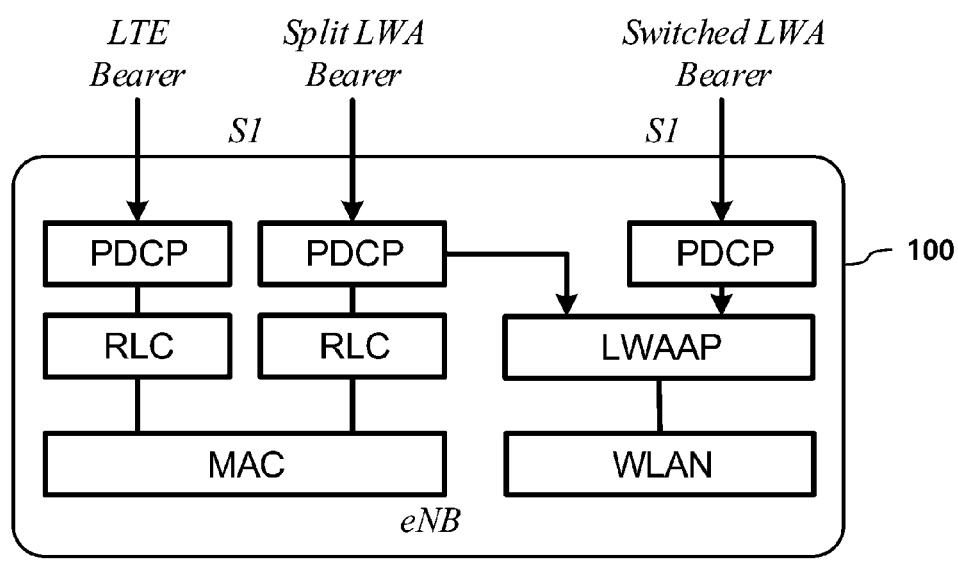
FIG. 1 is a diagram exemplarily showing an LWA wireless protocol structure for a collocated scenario.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In the present specifications, a machine type communication (MTC) terminal may refer to a terminal that supports low cost (or low complexity), a terminal that supports coverage enhancement, or the like. In the present specifications, the MTC terminal may refer to a terminal that supports low cost (or low complexity) and coverage enhancement, or the like. Alternatively, in the present specifications, the MTC terminal refers to a terminal that is defined as a predetermined category for maintaining low costs (or low complexity) and/or coverage enhancement.

In other words, in the present specifications, the MTC terminal may refer to a newly defined 3GPP Release 13 low cost (or low complexity) UE category/type, which executes LTE-based MTC related operations. Alternatively, in the present specifications, the MTC terminal may refer to a UE category/type that is defined in or before 3GPP Release-12 that supports the enhanced coverage in comparison with the existing LTE coverage, or supports low power consumption, or may refer to a newly defined Release 13 low cost (or low complexity) UE category/type.

The wireless communication system may be widely installed to provide various communication services, such as a voice service, a packet data service, and the like. The wireless communication system may include a User Equipment (UE) and a Base Station (BS or an eNB). Throughout the specifications, the user equipment may be an inclusive concept indicating a user terminal utilized in wireless communication, including a UE (User Equipment) in wideband code division multiple access (WCDMA), LTE, high speed packet access (HSPA), and the like, and an MS (Mobile station), a UT (User Terminal), an SS (Subscriber Station), a wireless device, and the like in global systems for mobile communication (GSM).

A base station or a cell may generally refer to a station that performs communication with a User Equipment (UE). The base station or cell may also be referred to as a Node-B, an evolved Node-B (eNB), a Sector, a Site, a Base Transceiver System (BTS), an Access Point, a Relay Node, a Remote Radio Head (RRH), a Radio Unit (RU), and the like.

That is, the base station or the cell may be construed as an inclusive concept indicating a portion of an area covered by a BSC (Base Station Controller) in CDMA, a NodeB in WCDMA, an eNB or a sector (site) in LTE, and the like, and the concept may include various coverage areas, such as a megacell, a macrocell, a microcell, a picocell, a femtocell, a communication range of a relay node, and the like.

Each of the above-mentioned various cells has a base station that controls a corresponding cell. Thus, the base station may be construed in two ways. i) the base station may be a device that provides a megacell, a macrocell, a microcell, a picocell, a femtocell, and a small cell in association with a wireless area, or ii) the base station may indicate a wireless area itself. In i), a base station may be all devices that interact with one another and are controlled by an identical entity to or all devices that cooperate each other to provide the predetermined wireless area. Based on a configuration type of a wireless area, an eNB, an RRH, an antenna, an RU, a Low Power Node (LPN), a point, a transmission/reception point, a transmission point, a reception point, and the like may be embodiments of a base station. In ii), a base station may be a wireless area itself that receives or transmits a signal from a perspective of a terminal or a neighboring base station.

Therefore, a megacell, a macrocell, a microcell, a picocell, a femtocell, a small cell, an RRH, an antenna, an RU, an LPN, a point, an eNB, a transmission/reception point, a transmission point, and a reception point are commonly referred to as a base station.

In the specifications, the user equipment and the base station are used as two inclusive transceiving subjects to embody the technology and technical concepts described in the specifications, and may not be limited to a predetermined term or word. In the specification, the user equipment and the base station are used as two (uplink or downlink)

inclusive transceiving subjects to embody the technology and technical concepts described in the specifications, and may not be limited to a predetermined term or word. Here, Uplink (UL) refers to data transmission and reception from a UE to a base station, and Downlink (DL) refers to data transmission and reception from a base station to a UE.

Varied multiple access schemes may be unrestrictedly applied to the wireless communication system. Various multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like may be used. An embodiment of the present disclosure may be applicable to resource allocation in an asynchronous wireless communication scheme that is advanced through GSM, WCDMA, and HSPA, to be LTE and LTE-advanced, and may be applicable to resource allocation in a synchronous wireless communication scheme that is advanced through CDMA and CDMA-2000, to be UMB. The present disclosure may not be limited to a specific wireless communication field and may include all technical fields in which the technical idea of the present disclosure is applicable.

Uplink transmission and downlink transmission may be performed based on i) a TDD (Time Division Duplex) scheme that performs transmission based on different times or ii) an FDD (Frequency Division Duplex) scheme that performs transmission based on different frequencies.

Further, a standard for a system such as LTE and LTE-A may be developed by configuring an uplink and a downlink based on a single carrier or a pair of carriers. The uplink and the downlink may transmit control information through a control channel, such as a PDCCH (Physical Downlink Control CHannel), a PCFICH (Physical Control Format Indicator CHannel), a PHICH (Physical Hybrid ARQ Indicator CHannel), a PUCCH (Physical Uplink Control CHannel), an EPDCCH (Enhanced Physical Downlink Control CHannel), and the like. The uplink and downlink may transmit data information through a data channel, such as a PDSCH (Physical Downlink Shared CHannel), a PUSCH (Physical Uplink Shared CHannel), and the like.

Control information may be transmitted using an EPDCCH (enhanced PDCCH or extended PDCCH).

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system, according to embodiments, refers to a Coordinated Multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and terminals.

A multi-transmission/reception point may be a base station or a macro cell (hereinafter, referred to as an 'eNB') and at least one RRH that is connected to the eNB through an optical cable or an optical fiber and is wiredly controlled, and has a high transmission power or a low transmission power within a macro cell area.

Hereinafter, a downlink refers to communication or a communication path from a multi-transmission/reception point to a terminal, and an uplink refers to communication or a communication path from a terminal to a multi-transmission/reception point. In an uplink, a transmitter may be a part of a terminal and a receiver may be a part of a multiple transmission/reception point. In an uplink, a transmitter may be a part of a terminal and a receiver may be a part of a multiple transmission/reception point.

Hereinafter, signal transmission and reception through a PUCCH, a PUSCH, a PDCCH, or a PDSCH may be described through the expression, "a PUCCH, a PUSCH, a PDCCH, or a PDSCH is transmitted or received".

In addition, hereinafter, the expression "a PDCCH is transmitted or received, or a signal is transmitted or received through a PDCCH" may have the same meaning of "an EPDCCH is transmitted or received, or a signal is transmitted or received through an EPDCCH".

That is, a physical downlink control channel used herein may indicate a PDCCH or an EPDCCH, and may indicate a meaning including both a PDCCH and an EPDCCH.

In addition, for convenience of description and ease of understand, a PDCCH is used to describe some embodiments of the present disclosure. However, an EPDCCH may be applied to the same embodiment similarly. Further, the EPDCCH is used to describe some other embodiments of the present disclosure. However, the PDCCH may be applied to the same embodiment similarly.

Meanwhile, higher layer signaling includes an RRC signaling that transmits RRC information including an RRC parameter.

An eNB executes downlink transmission to terminals. The eNB may transmit a Physical Downlink Shared Channel (PDSCH) which is a primary physical channel for unicast transmission and may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

LWA(LTE-WLAN Aggregation) Technology

3GPP introduced a LWA technology that enables transmitting downlink data using both of a base radio resource and WLAN radio resource. In this specification, LWA is a technology of transmitting/receiving data using a mobile communication radio resource of a base station (e.g., an LTE radio resource or a base station radio resource) and a radio resource of a WLAN. LWA, which is a term for the convenience of description, means a technology enabling a terminal and a base station to transmit/receive data using a radio resource distributed/designated/set on the basis of a base station and a radio resource used on the basis of the WLAN technology. An LWA bearer means a bearer set to use the LWA technology. For example, the LWA bearer may mean a bearer set to use both of a base station radio resource and a WLAN radio resource. Alternatively, the LWA bearer means a bearer that may use any one of base station radio resource and a WLAN radio resource, depending on setting. Accordingly, a base station radio resource in an LWA bearer may be used as the same meaning even if not only an LTE technology, but various types of technologies for a base station to transmit/receive data are applied. Hereinafter, LTE is described as a representative technology for utilizing base station resources for describing embodiments of the present disclosure. However, LTE is not limited thereto. LTE denotes all technologies for allocating, distributing, and configuring a radio resource through a base station.

LWA may have various wireless protocol structures, depending on how a bearer is set up with an LWA backhaul scenario.

FIG. 1 is a diagram exemplarily showing an LWA wireless protocol structure for a collocated scenario.

Referring to FIG. 1, a base station 100 may include a WLAN entity for using a WLAN radio resource. Such structure may be applied to a scenario in which a base station and a WLAN end are positioned at the same location.

Figure 2:
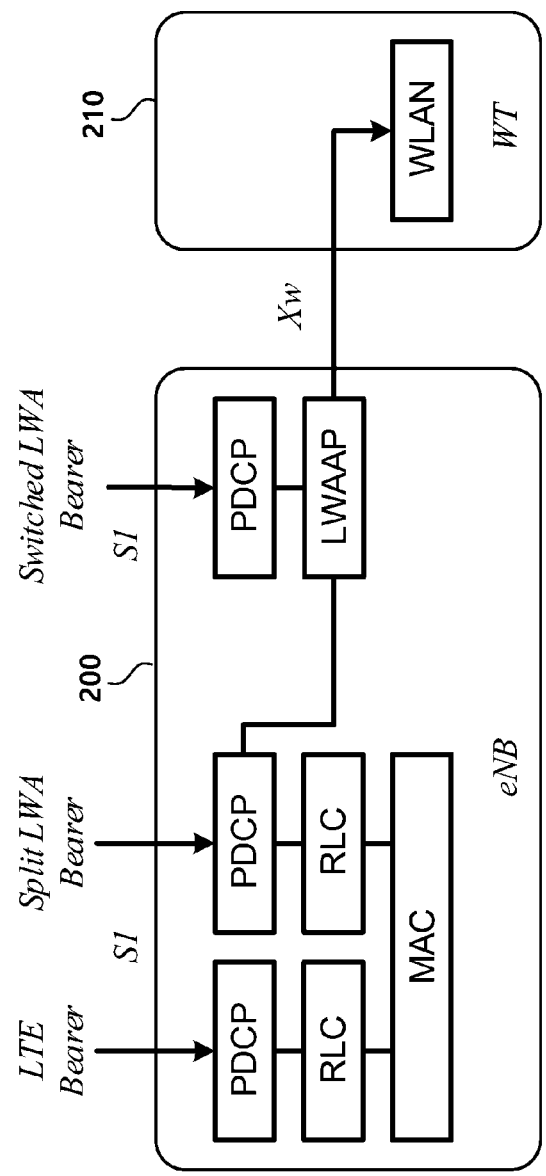
FIG. 2 is a diagram exemplarily showing an LWA wireless protocol structure for a non-collocated scenario.

FIG. 2 is a diagram exemplarily showing an LWA wireless protocol structure for a non-collocated scenario.

Referring to FIG. 2, a base station 200 includes an LTE-WLAN Aggregation Adaptation Protocol (LWAAP) entity for using a WLAN radio resource. A WLAN end 310 includes a WLAN block as a low layer block for setting a WLAN radio source.

In FIGS. 1 and 2, the LWAAP protocol entity may be a hardware circuit, a processor, a unit, or a device, that performs the function of connecting a base station PDCP entity and a WLAN physical layer entity. That is, the LWAAP protocol entity is not limited to names or terms.

There may be two bearer types for the LWA, as shown in FIGS. 1 and 2.

A split LWA bearer means a bearer in which a wireless protocol exists in both of a base station and a WLAN to use both of a base station radio resource and a WLAN wireless resource.

A switched LWA bearer means a bearer in which a wireless protocol exists in both of a base station and WLAN, but uses only a WLAN radio resource.

In this specification, the split LWA bearer and the switched LWA bearer are, in combination, referred to as an LWA bearer, but may be separately described, if necessary. However, an embodiment of the split LWA bearer and an embodiment of the switched LWA bearer may be applied to each other.

An LTE-WLAN Aggregation (LWAAP) entity creates an LWA PDU including a DRB identifier for PDUs transmitted through a WLAN in an LWA operation. WLAN termination (WT) uses LWA EtherType to forward data to a terminal through the WLAN. The terminal uses LWA EtherType to determine whether a received PDU belongs to an LWA bearer. Further, the terminal uses the DRB identifier to determine which LWA bearer a PDU belongs to.

In a downlink, the LWA supports a split bearer operation in which a PDCP sub-layer of a terminal supports in-sequence transmission of higher-layer PDUs on the basis of a reordering procedure introduced in dual connectivity. In an uplink, the PDCP PDUs are transmitted only through LTE (e.g., a base station radio resource).

As described, a Rel-13 LWA bearer constitutes an LTE Layer2 entity for uplink transmission of a terminal in order to enable a split LWA bearer and a switched LWA bearer both to transmit PDCP PDUs on an uplink through LTE. Accordingly, a terminal used a reordering function that is applied to a dual connectivity split bearer stated in PDCP standards not only when a split LWA bearer was configured, but also when a switched LWA bearer was configured in the terminal. Accordingly, a terminal can sequentially receive PDUs that are randomly transmitted through two paths by reordering them even when reconfiguration of a switched LWA (reconfiguration into a switched LWA bearer from an LTE bearer or reconfiguration into an LTE bearer from a switched LWA bearer) occurs.

Accordingly, uplink load on a base station could be increased when LWA according to the related art is applied.

In particular, uplink data may be transmitted only through a base station even if WLAN load is low, so effective offloading was difficult.

Data Available for Transmission

A buffer state reporting procedure is used to provide a serving eNB with information about data available for transmission at uplink buffers of a UE linked to a MAC entity of the serving eNB (hereafter, referred to as "available data" or "transmittable data" for the convenience of description).

For MAC buffer state reporting, a terminal should consider the followings as the available data in an RLC layer.
  RLC SDUs, or segments thereof (that have not yet been included in an RLC data PDU)
  RLC data PDUs, or portions thereof (that are pending for retransmission (RLC AM))

For MAC buffer state reporting, a terminal should consider PDCP control PDUs and the followings as the available data in a PDCP layer
  for SDUs for which no PDU has been submitted to lower layers
  the SDU itself, if the SDU has not yet been processed by PDCP
  the PDU, if the SDU has been processed by PDCP Further, for a radio bearer that is mapped to RLC AM, if a PDCP entity has performed a resetting procedure, a terminal should consider the followings as the available data in a PDCP layer.

Except for SDUs indicating successive transmission of a PDCP state report, for an SDU for a corresponding PDU in which a PDU has been submitted to a low layer before PDCP reconfiguration, starting with the first SDU for transmission of corresponding PDUs not recognized by the low layer,
  SDU, if not processed yet by PDCP
  the PDU once it has been processed by PDCP As described, an LWA bearer was set to be transmitted through only LTE for an uplink in the related art. Accordingly, a terminal could use the available data that is used in LTE of the related art for MAC buffer state reporting. However, when uplink transmission through a WLAN radio resource is allowed for LWA bearers, data may be split/routed/divided by a PDCP buffer to be divisionally used through an LET radio resource and a WLAN radio resource, or a WLAN radio resource may be used without using an LTE radio resource. If the available data of the related art is used for LWA bearers allowed to perform uplink transmission through a WLAN, an excessive amount of buffering is reported and scheduled to a base station. As a result, radio resources may be wasted. For example, when an LWA bearer transmits uplink data through a WLAN radio resource, according to the related art, the data of PDCP transmitted through the WLAN radio resource can also be used as a reference for determining the buffer state of a MAC entity. In this case, a base station cannot distinguish uplink data transmitted using the WLAN radio resource and excessive base station radio resource is designated for uplink data reception of a terminal.

High-Speed WLAN Technology

IEEE 802.11 provides a WLAN technology and keeps evolved in accordance with the requirement of high-speed throughput by users.

IEEE 802.11ax increases frequency efficiency, as compared with IEEE 802.11, in bands of 2.4 GHz and 5 GHz. To this end, an uplink scheduled in concentration on dense deployment is provided and the maximum throughput theoretically reaching 9.6 Gbps is provided. 1.6 Gbps is provided under actual conditions.

IEEE 802.11ad adds support for a millimeter wave band of 60 GHz and provides up to a speed of 7 Gbps.

IEEE 802.11ay is in the process of improving 802.11ad and provides a speed of 20 Gbps.

As described, the related art has defined to transmit uplink data only through a base station radio resource. Accordingly, uplink load on a base station could be increased when LWA is applied. Unlike the related art, if the available data is applied to LWA bearers which are allowed to perform uplink transmission through a WLAN radio resource, an excessive amount of buffering is reported and scheduled to a base station. As a result, radio resources may be wasted.

Similarly, when an LWA bearer provides uplink transmission through a base station radio resource and a WLAN radio resource, the amount of data that is transmitted through the WLAN radio resource may not be considered, and an excessive amount of buffering may be reported and scheduled to a base station. As a result, radio resources may be wasted.

In order to solve this problem, the present disclosure provides various detailed embodiments for efficiently providing the available data of an LWA bearer, which supports uplink transmission through a WLAN radio resource, to a base station.

Further, a detailed method may be provided for enabling a terminal to set an LWA bearer and determine an uplink data transmission path.

A base station should accurately recognize terminal capability of an RRC connected terminal to provide an appropriate configuration to the terminal. For example, MME stores terminal capability composed of UE Radio Access Capability and UE Core Network Capability.

To this end, for example, UE Core Network Capability may be informed by a terminal through NAS signaling (attach procedure etc.). Alternatively, UE Radio Access Capability may be transmitted from a terminal to a base station using an UE capability transfer procedure and transmitted to an S1 interface through MME. Alternatively, UE Radio Access Capability may be assigned to MME through NAS signaling (attach procedure etc.) by a terminal and transmitted to a base station through an S1 interface.

If available, MME transmits UE Radio Access Capability to a base station every time a terminal enters an RRC connected state.

FIG. 3 is a diagram exemplarily showing LWA UE-EUTRA-Capability information elements and field.

Referring to FIG. 3, LWA-parameter UE capability is defined as in FIG. 3, as a UE-EUTRA-Capability information element for supporting LWA. For example, a 'lwa-r13' field may include information about whether a terminal supports the LWA technology. A 'lwa-SplitBearer-r13' field includes information about whether a terminal supports a split LWA bearer.

In detail, for example, when a terminal is set to support both of the 'lwa-r13' and the 'lwa-splitbearer-r13' on UE-capability parameters and this is instructed to a base station, the base station may know that the terminal supports a split LWA bearer. Alternatively, when a terminal is set to support the 'lwa-r13' without supporting the 'lwa-splitbearer-r13' on UE-capability parameters and forms this of a base station, the base station may know that the terminal supports switched LWA bearer.

However, as described above, a split LWA bearer and a switched LWA bearer support uplink data only through a base station radio resource in the related art.

Accordingly, as described in the present disclosure, when uplink data is transmitted using a WLAN radio resource, there is a need for a detailed procedure for setting and using the uplink data transmission.

For example, a base station should be able to recognize that a terminal is capable of performing uplink transmission through a WLAN radio resource, different from LWA of the related art, and capable of configuring uplink transmission through a WLAN radio resource only for a terminal that supports this function. Alternatively, an operation linked to uplink transmission through WLAN radio resource may be instructed.

To this end, a base station may instruct a terminal to support uplink transmission through a WLAN radio resource by determining a new information element (or field) on a UE-capability parameter. However, in the following description, an LWA bearer set to transmit uplink data using a WLAN radio resource is referred to as an uplink bearer split or an uplink bearer switch. The uplink bearer split means an LWA bearer for transmitting uplink data using both of a base radio resource and a WLAN radio resource and may be variously expressed as an LWA uplink bearer split, an uplink split bearer, an uplink split, an LWA uplink split, and an uplink bearer split. The uplink bearer switch means an LWA bearer for transmitting uplink data using a base station radio resource and a WLAN radio resource, depending on setting, and may be variously expressed as an LWA uplink bearer switch, an uplink switch bearer, an uplink switch, an LWA uplink switch, an uplink bearer switch, and an uplink switched bearer.

A terminal needs to transmit information elements to a base station so that the base station knows whether the terminal is set using a WLAN radio resource.

For example, an information element for indicating that uplink transmission using both of a base station radio resource and a WLAN radio resource is supported through an uplink bearer split may be defined.

Alternatively, an information element for indicating that uplink transmission is supported through WLAN may be defined. It is possible to indicate that uplink transmission through a WLAN radio resource is possible, through an uplink bearer switch.

Alternatively, it is possible to define an information element for indicating that uplink transmission is supported through WLAN and define an information element for indicating (e.g., informing) that uplink transmission using both of a base station radio resource and a WLAN radio resource is supported through an uplink bearer spit (in PDCP).

LWA Uplink Protocol Structure

Figure 4:
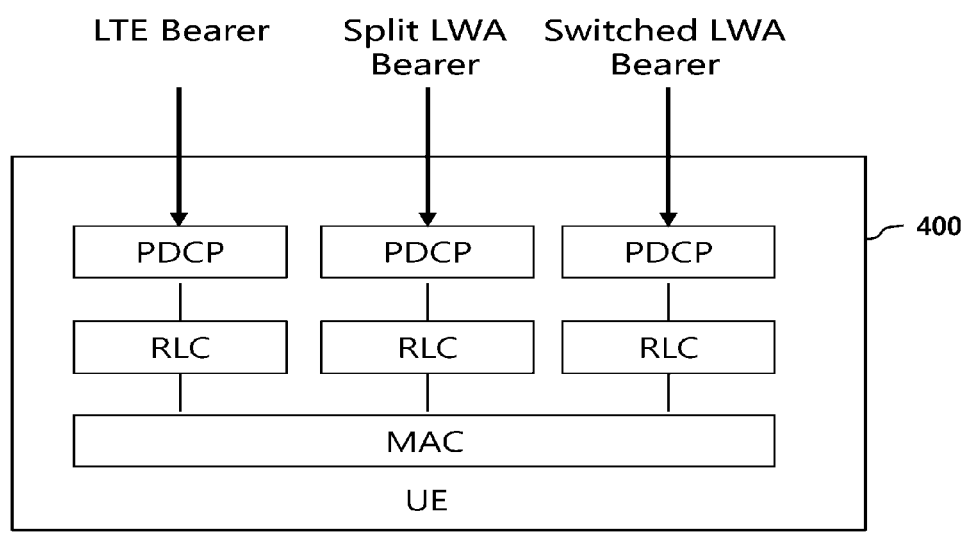
FIG. 4 is a diagram exemplarily showing a Layer2 structure for uplink data transmission of a terminal in the related art.

FIG. 4 is a diagram exemplarily showing a Layer 2 structure for uplink data transmission of a terminal in the related art.

Referring to FIG. 4, as described, typical LWA bearers all used a base station radio resource for uplink. Accordingly, a terminal 400 may use a typical LTE UL Layer2 structure.

Figure 5:
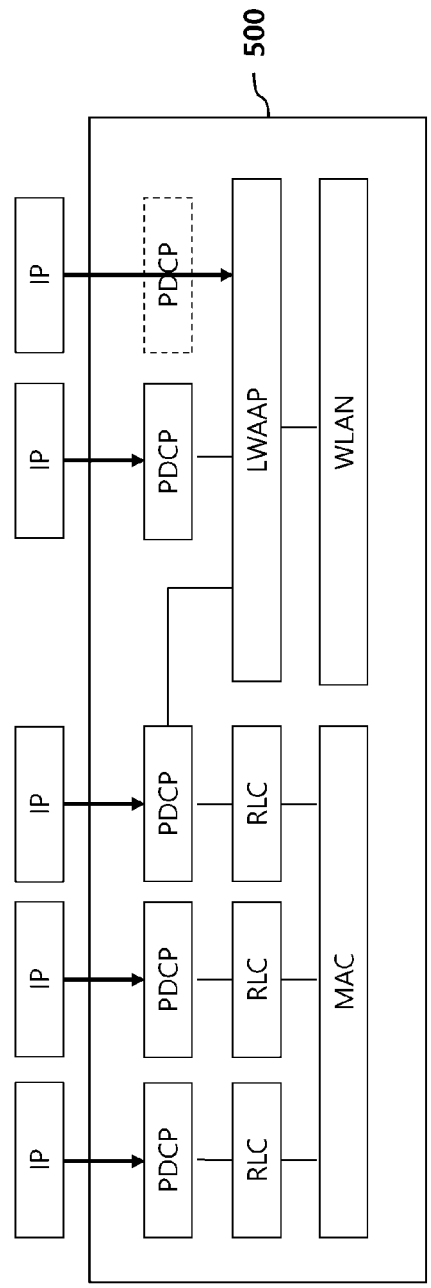
FIG. 5 is a diagram exemplarily showing an LWA wireless protocol structure for uplink data transmission according to an embodiment.

FIG. 5 is a diagram exemplarily showing an LWA wireless protocol structure for uplink data transmission according to an embodiment.

Referring to FIG. 5, a terminal 500 may be configured to have an AM RLC entity and a MAC entity linked to a base station through uplink, for an LWA bearer that is an uplink bearer split.

Alternatively, the terminal 500 may be configured to have an AM RLC entity and a MAC entity linked to a base station through uplink for an LWA bearer that is an uplink bearer switch. Alternatively, a DRB configuration should not be decomposed on LTE access in a corresponding bearer.

Alternatively, the terminal 500 may be configured not to have an AM RLC entity and a MAC entity linked to a base station through uplink for an LWA bearer that is an uplink bearer switch.

For PDUs transmitted through WLAN, a LWAAP entity creates an LWA PDU including DRB identity. A base station may determine whether a PDU belongs to an LWA bearer using LWA Ethertype and determine which LWA bearer a PDU belongs to using DRB identity. The LWAAP entity shown in FIG. 5 is configured to specify a terminal, but this may be configured for each bearer and is included in the scope of the present disclosure. The LWAAP entity may be expressed as other terms having similar functions or may be replaced by entities expressed as other terms, which are also included in the scope of the present disclosure.

A base station needs to set a transmission path for an LWA bearer using a WLAN radio resource. For example, it is required to assign a corresponding LWA bearer to transmit uplink data using a WLAN radio resource or make a terminal select a radio terminal for transmitting uplink data.

Hereinafter, a method of determining an uplink data transmission path for an LWA bearer according to various embodiments and of determining a transmission path for an available data will be described with reference to the accompanying drawings.

Data Transmission Path Instructing Information

A base station may instruct a terminal to use an uplink data transmission path for an LWA bearer through an RRC message.

For example, a base station may include information for instructing to use both of a base station radio resource and a WLAN radio resource through an uplink bearer split, in DRB configuration information (PDCP configuration information) included in RRC reconfiguration information.

Alternatively, a base station may include information for instructing a terminal to select and use one of a base station radio source and a WLAN radio resource (or a base station radio link and a WLAN radio link) for an uplink transmission path, in DRB configuration information (or PDCP configuration information) included in an RRC reconfiguration message.

Alternatively, a base station may include information for instructing to select and use one of a base station radio source and a WLAN radio resource (or a base station radio link and a WLAN radio link) for a transmission path, which may be transmitted through an uplink bearer split but is transmitted as a default, in DRB configuration information (or PDCP configuration information) included in an RRC reconfiguration message.

Alternatively, a base station may instruct to use uplink bearer spilt for a split LWA bearer. Alternatively, a base station may instruct to use an uplink bearer switch for a switched LWA bearer. Alternatively, a base station may not instruct to use an uplink bearer split for a switched LWA bearer.

Hereinafter, an operation of determining an uplink data transmission path of a terminal and a base station will be described with reference to the drawings.

Figure 6:
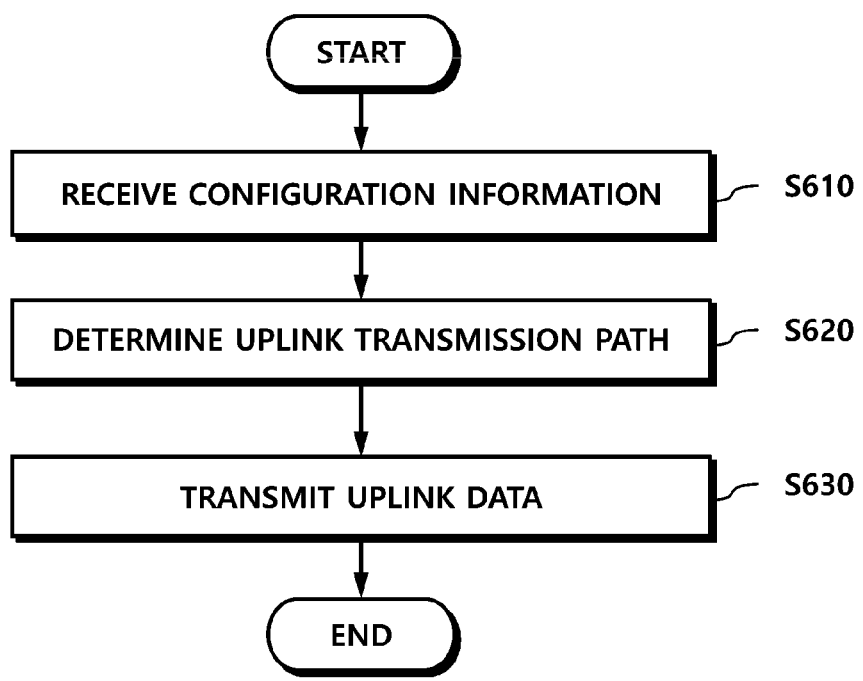
FIG. 6 is a flowchart illustrating a method of a terminal for performing uplink data transmission through an LWA bearer according to an embodiment.

FIG. 6 is a flowchart illustrating a method of a terminal for performing uplink data transmission through an LWA bearer according to an embodiment.

Referring to FIG. 6, a terminal performs operations for receiving configuration information for indicating uplink transmission configuration for an LWA bearer from a base station (S610). For example, the configuration information may include at least one of path indication information for indicating n uplink transmission path of an LWA bearer and a threshold value. That is, the configuration information may include a path instruction information for indicating a uplink transmission path for an LWA bearer that is set to be able to transmit uplink data using a WLAN radio resource and threshold value that may be used for a terminal to determine an uplink transmission path. The terminal may receive the configuration information from the base station. For example, the configuration information can be received through an RRC message. Alternatively, the configuration information may be received together with PDCP configuration information transmitted from the base station.

In detail, the path instruction information includes information about whether a terminal should transmit a PDCP PDU through an LWAAP entity configured in the terminal for an LWA bearer. The path-threshold value information may include critical information that is used to determine an uplink data split operation for an LWA DRB.

The terminal performs operations of determining an uplink transmission path for the LWA bearer on the basis of the configuration information and a transmittable data amount (S620).

For example, the terminal determines an uplink transmission path for the LWA bearer based on the received configuration information and a result of comparing the-threshold value information and the uplink transmittable data amount.

In detail, for example, the terminal determines an uplink transmission path by checking path instruction information included in the configuration information when the uplink transmittable data amount is less than the threshold value. If the path instruction information has an instruction to transmit uplink data using a WLAN radio resource, the terminal transmits the uplink data of the LWA bearer to the base station using the WLAN radio resource. In this case, the terminal sets the transmittable data amount as 0 and reports it to a MAC entity configured in relation to the base station. Unlikely, if the path instruction information does not have an instruction to transmit uplink data using a WLAN radio resource, the terminal transmits the uplink data of the LWA bearer to the base station using the base station radio resource. Further, the terminal transmits the transmittable data amount to the MAC entity configured in relation to the base station.

Unlikely, when the uplink transmittable data amount is greater than the threshold value, the terminal transmits uplink data to the base station using a base station radio resource or a WLAN radio resource, depending on a request from a lower layer. For example, the terminal transmits the uplink data to the base station using a base station radio resource or a WLAN radio resource, depending on a request from an AM RLC entity that is a lower layer of a PDCP entity, or an LWAAP entity. In this case, the terminal may transmit the uplink data to the base station using both of the base station radio resource and the WLAN radio resource.

As described above, the terminal may primarily compare the threshold value included in the configuration information with the transmittable data amount of the PDCP entity, and may additionally check path instruction information and determine an uplink data transmission path for the LWA bearer when the transmittable data amount is less than the threshold value. Further, the terminal may determine an uplink data transmission path for the LWA bearer in accordance with a request from a lower layer without checking path instruction information when the transmittable data amount is greater than the threshold value.

Further, the terminal performs operations of transmitting uplink data to the base station through the determined uplink transmission path (S630). The terminal report submits a PDCP PDU to a lower entity on the determined uplink transmission path such that the uplink data is transmitted to the base station through the corresponding transmission path.

As described above, the LWA bearer means a bearer configured to transmit uplink data using at least one of a base station radio resource and a WLAN radio resource.

Figure 7:
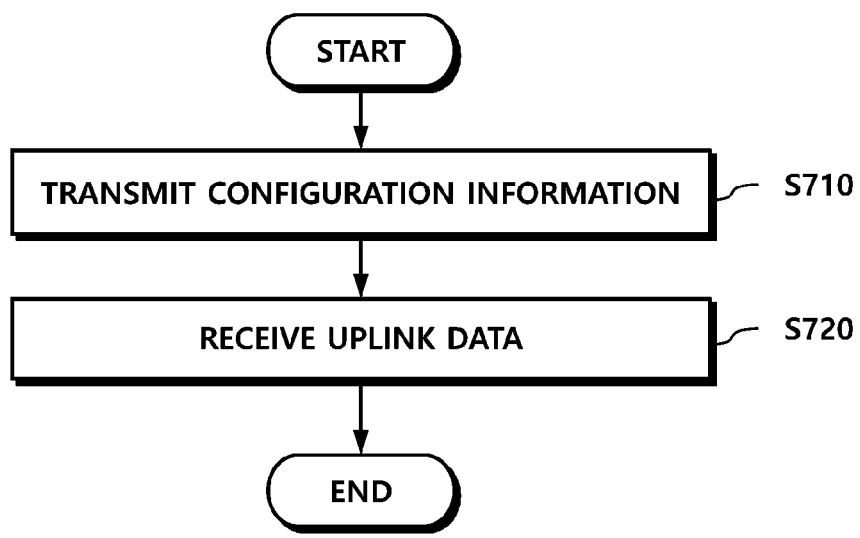
FIG. 7 is a flowchart illustrating a method of a base station for receiving uplink data through an LWA bearer according to an embodiment.

FIG. 7 is a flowchart illustrating for a method of a base station for receiving uplink data through an LWA bearer according to an embodiment.

Referring to FIG. 7, a base station performs operations of transmitting configuration information for indicating uplink transmission configuration for an LWA bearer to a terminal (S710). The configuration information includes at least one of path instruction information for instructing to use an uplink transmission path of the LWA bearer and threshold value. The LWA bearer may be configured to receive uplink data using at least one of a base station radio resource and a WLAN radio resource.

The base station performs operations of receiving uplink data through the uplink transmission information for the LWA bearer determined on the basis of the configuration information and the uplink transmittable data amount of the terminal (S720). The base station may receive the uplink data through the base station radio resource and the WLAN radio resource determined by the uplink transmittable data amount and the configuration information of the terminal.

For example, the terminal determines an uplink transmission path for the LWA bearer based on the received configuration information and a result of comparing the threshold value with the uplink transmissible data amount.

In detail, for example, the terminal determines an uplink transmission path by checking path instruction information included in the configuration information when the uplink transmissible data is less than the threshold value. If the path instruction information has an instruction to transmit uplink data using a WLAN radio resource, the terminal transmits the uplink data of the LWA bearer to the base station using the WLAN radio resource. Unlikely, if the path instruction information does not have an instruction to transmit uplink data using a WLAN radio resource, the terminal transmits the uplink data of the LWA bearer to the base station using the base station radio resource.

Unlikely, when the uplink transmittable data amount is greater than the threshold value, the terminal transmits uplink data to the base station using a base station radio resource or a WLAN radio resource, depending on a request from a lower layer. For example, the terminal transmits the uplink data to the base station using a base station radio resource or a WLAN radio resource, depending on a request from an AM RLC entity that is a lower layer of a PDCP entity, or an LWAAP entity. In this case, the terminal may transmit the uplink data to the base station using both of the base station radio resource and the WLAN radio resource.

As described above, the base station may receive the uplink data for the LWA bearer through the radio resource that is determined on the basis of the result of primarily comparing the threshold value included in the configuration information with the transmittable data amount of the PDCP entity by the terminal and the path instruction information.

As described, when set to transmit uplink data for an LWA bearer using a WLAN radio resource, the base station may instruct to use an uplink data transmission path by transmitting the configuration information to the terminal. The terminal may recognize the uplink data transmission path for the LWA bearer set to transmit uplink data using a WLAN radio resource on the basis of the information about the transmittable data amount and the configuration information.

On the other hand, as described above, the LWA bearer may be classified into two types of an uplink bearer split and an uplink bearer switch.

Hereinafter, a method for processing available data of uplink data for each of an uplink bearer split and an uplink bearer switch according to embodiments will be described. The available data may be used as the same meaning as the transmittable data amount of the PDCP entity described with reference to FIGS. 6 and 7, and the uplink data transmission path of an LWA bearer may be determined in accordance with the method of processing the available data. As described, it is important to determine which lower layer entity will process the transmittable data amount in the PDCP entity, in addition to determining which uplink data transmission path for an LWA bearer. Accordingly, a method of processing a transmittable data according to an embodiment will be described, hereinafter. Further, an uplink data transmission path may be determined in accordance with the method of processing a transmittable data.

Further, embodiments will be separately described for an uplink bearer switch and an uplink bearer spilt. However, the embodiments of the present disclosure are not limited thereto. For example, the uplink bearer switch may be similarly applied to embodiments described with the uplink bearer split, the uplink bearer split may be similarly applied to embodiments described with the uplink bearer switch, or both the uplink bearer switch and the uplink bearer split may be similarly applied to the embodiments described with the uplink bearer split or the uplink bearer switch.

Method of Processing Available Data when Uplink Bearer Switch Transmission is Configured When transmitting data to an uplink through a WLAN radio resource, using an uplink bearer switch, a terminal may process a PDCP available data by independently using or combining/partially combining the following embodiments.

1) Reporting PDCP Available Data as 0

For example, an LWA bearer that transmits uplink data through a WLAN radio resource using an uplink bearer switch may not be linked to an AM RLC entity or a MAC entity configured in relation to a base station. For example, there is no need for interaction with corresponding entities while uplink data is transmitted through a WLAN radio resource.

Alternatively, an LWA bearer that transmits uplink data through a WLAN radio resource, using an uplink bearer switch may be related with the AM RLC entity or the MAC entity configured for a base station, but may not transmit uplink data through a corresponding entity when transmitting uplink data through the WLAN radio resource.

Accordingly, when a terminal is configured to use the uplink bearer switch (or a terminal is set to transmit uplink data through a WLAN radio resource on the uplink bearer switch by a higher layer (RRC)), the terminal may indicate the PDCP available data as 0. If a terminal is configured to use only one of a base station radio resource and a WLAN radio resource, using the uplink bearer switch, but is instructed to use the base station radio resource (or if a terminal is set not to transmit uplink data through the WLAN radio resource on the uplink bearer switch by an higher layer), the terminal may report the PDCP available data to the MAC entity configured in relation to the base station.

To this end, for example, if path instruction information is configured to set an uplink through the WLAN radio resource when an available data is indicated as an MAC entity for BSR triggering and buffer size calculation for a switched LWA bearer, the terminal indicates the available data for transmission as 0 to the MAC entity.

When the path instruction information by a higher layer is not set to use the WLAN radio resource for an uplink (or when path instruction information is not configured or when path instruction information is configured to as an uplink bearer split), the terminal may indicate the PDCP available data as the MAC entity linked to the base station.

To this end, for example, if path instruction information by a higher layer is set to use the WLAN radio resource for an uplink when an available data is indicated as an MAC entity for BSR triggering and buffer size calculation for a split LWA bearer, the terminal inform of the MAC entity the available data for transmission as 0.

When the path instruction information by a higher layer is not set to use the WLAN radio resource for an uplink (or when path instruction information is not configured or when path instruction information is configured as an uplink bearer split), the terminal may notify the PDCP available data as the MAC entity linked to the base station.

2) Method not Including PDCP Available Data

For example, an LWA bearer for transmitting uplink data through a WLAN radio resource using an uplink bearer switch may not be linked to an AM RLC entity or a MAC entity configured for a base station. Alternatively, there is no need for interaction with corresponding entities while uplink data is transmitted through a WLAN radio resource.

Alternatively, an LWA bearer for transmitting uplink data through a WLAN radio resource, using an uplink bearer switch may be related with the AM RLC entity or the MAC entity configured for a base station, but may not transmit uplink data through a corresponding entity when transmitting uplink data through the WLAN radio resource.

Accordingly, when a terminal is configured to use the uplink bearer switch (or a terminal is set to transmit uplink data through WLAN on the uplink bearer switch by a higher layer (RRC)), the terminal may not indicate the PDCP available data as 0. Alternatively, the terminal may not report the PDCP available data to the MAC entity configured for the base station. Alternatively, the terminal may not apply the PDCP available data to the MAC entity configured for the base station. Alternatively, the terminal may not consider the PDCP available data for the MAC entity configured for the base station. If a terminal is configured to use only one of a base station radio resource and a WLAN radio resource, using the uplink bearer switch, but is instructed to use the base station radio resource (or if a terminal is set not to transmit uplink data through the WLAN radio resource on the uplink bearer switch by an higher layer), the terminal may inform the PDCP available data to the MAC entity configured as the base station.

For example, for MAC buffer state reporting, the terminal may consider PDCP control PDUs and the followings as the available data for transmission, except for the case in which the terminal is configured to set the path instruction information for the LWA bearer to an uplink through the WLAN radio resource in a PDCP layer (or the terminal transmits data to the uplink only through the WLAN radio resource for a split LWA bearer, transmits data to the uplink only through the WLAN radio resource for a switched LWA bearer, is configured to use the uplink bearer switch, or is set to transmit uplink data through the WLAN radio resource on the uplink bearer switch by a higher layer (RRC)).

For SDUs for which no PDU has been submitted to lower layers
   SDU, if not processed yet by PDCP
   PDU, if SDU is processed by PDCP Further, for a radio bearer that is mapped to RLC AM, if a PDCP entity has performed a resetting procedure, a terminal should consider the followings as the available data in a PDCP layer.

Except for SDUs indicating successive transmission of a PDCP state report, for an SDU for a corresponding PDU in which a PDU has be reported to a low layer before PDCP reconfiguration, starting with the first SDU for transmission of corresponding PDUs not recognized by the low layer,
   the SDU, if not processed yet by PDCP
   the PDU, once it has been processed by PDCP Alternatively, when the path instruction information by a higher layer is not set to an uplink through the WLAN radio resource (or when path instruction information is not configured or configured as an uplink bearer split), the terminal may report the PDCP available data to the MAC entity configured as the base station.

3) Method of Processing PDCP Available Data for Resetting/Reconfiguration

When the LWA bearer or an LWA configuration of a terminal is changed (for example, reconfigured or corrected) in accordance with movement of the terminal (for example, at least one of when a base station is changed, WT is changed, and when an LWA bearer or an LWA configuration is changed in configuration information medication in the same WT), the terminal may perform PDCP resetting or PDCP reconfiguration in accordance with instruction information of a base station.

For example, when an LWA bearer transmitting uplink data through a WLAN radio resource is reconfigured into an LTE bearer using only a base station resource in accordance with a change of a base station and PDCP is accordingly reset, for all SDUs for corresponding PDUs for which only PDUs have been submitted to lower LWAAP layers before resetting or starting with the first SDU for transmission of corresponding PDUs not recognized by a lower layer,
   the SDU, if not processed yet by PDCP,
   the PDU, once it has been processed by PDCP,
   can be considered as a PDCP available data.

Further, terminal may notify of this to the MAC entity configured in relation to a base station. Alternatively, if the path instruction information is not set to an uplink through a WLAN radio resource, the terminal may repot this to the MAC entity linked to a base station.

Further, for example, when a switched LWA bearer transmitting uplink data through a WLAN radio resource is reconfigured into a switched LWA bearer in accordance with a change of WT and PDCP is accordingly reset, for all SDUs for corresponding PDUs for which only PDUs have been submitted to lower LWAAP layers before resetting, or except for SDUs reported as being successfully transmitted by a PDCP state report, or starting with the first SDU for transmission of corresponding PDUs not recognized by a lower layer,
   the SDU, if not processed yet by PDCP,
   the PDU, once it has been processed by PDCP,
   may not be considered as a PDCP available data. Alternatively, the terminal may not report this to the MAC entity linked to the base station.

Further, for example, when a switched LWA bearer transmitting uplink data through a WLAN radio resource is reconfigured into a switched LWA bearer transmitting uplink data through a base station in accordance with change and reconfiguration of an uplink transmission path with a change of WT and PDCP is accordingly reset (or reconfigured), for all SDUs for corresponding PDUs for which only PDUs have been submitted to lower LWAAP layers before resetting (or reconfiguration), or except for SDUs reported as being successfully transmitted by a PDCP state report, or except for SDUs/PDUs reported as being successfully transmitted by recovery of PDCP data, or starting with the first SDU for transmission of corresponding PDUs not recognized by a lower layer, the SDU, if not processed yet by PDCP, the PDU, once it has been processed by PDCP, can be considered as a PDCP available data. Alternatively, the terminal may report this to the MAC entity linked to the base station.

Further, for example, when a LWA bearer transmitting uplink data through a WLAN radio resource is reconfigured into an LWA bearer in accordance with a change in an LWA bearer or LWA configuration and PDCP is accordingly reconfigured (or changed or reset), for all SDUs for corresponding PDUs for which only PDUs have been submitted to lower LWAAP layers before reconfiguration/change/resetting, or except for SDUs reported as being successfully transmitted by a PDCP state report, or starting with the first SDU for transmission of corresponding PDUs not recognized by a lower layer, the SDU, if not processed yet by PDCP, the PDU, once it has been processed by PDCP, may not be considered as a PDCP available data. Alternatively, the terminal may not report this to the MAC entity linked to the base station.

4) Method of Reporting PDCP Available Data to MAC Entity Linked to Base Station for Data Transmitted Through WLAN Radio Resource but not Recognized Yet When PDCP SDUs are received and a half or more of a PDCP SN space is not used (by PDCP PDUs), the PDCP PDUs may be directly transmitted to a lower layer. PDCP SN is linked to PDCP SDUs for over a half of the PDCP SN space, HFN desynchronization may occur. Accordingly, within a half of the PDCP SN space (when PDCP SDUs/PDUs linked to PDCP SN in PDCP buffer does not exceed a half of the PDCP SN space), a (transmitting) PDCP entity may submit PDCP PDUs processed by PDCP entity to an LWAAP (or WLAN/WLAN MAC) entity when PDCP SDUs are received.

Unlike a base station mobile communication technology, In WLAN, a WLAN station (e.g., a terminal) may attempt direct data transmission. WLAN transmission is performed on data buffered in a buffer in WLAN MAC in accordance with a WLAN MAC processing method. Accordingly, when PDCP SDUs are received and a half or more of a PDCP SN space is not used (by PDCP PDUs), PDCP may directly transmit PDCP PDUs to a lower layer.

Alternatively, within a half of the PDCP SN space (when PDCP SDUs/PDUs linked to PDCP SN in PDCP buffer does not exceed a half of the PDCP SN space), a (transmitting) PDCP entity may submit PDCP PDUs to an LWAAP (or WLAN/WLAN MAC) entity after performing a PDCP processing process on the PDCP SDUs of a predetermined ratio when PDCP SDUs are received. To this end, a base station may include a split ratio in DRB configuration information included in an RRC reconfiguration message such that a split ratio for uplink data transmitted to the base station can be semi-statically changed.

Alternatively, within a half of the PDCP SN space (when PDCP SDUs/PDUs linked to PDCP SN in PDCP buffer does not exceed a half of the PDCP SN space), a (transmitting) PDCP entity may submit PDCP SDUs/PDUs to an LWAAP (or WLAN/WLAN MAC) entity when PDCP SDUs at points of time having a predetermined interval.

Alternatively, within a half of the PDCP SN space (when PDCP SDUs/PDUs linked to PDCP SN in PDCP buffer does not exceed a half of the PDCP SN space), a (transmitting) PDCP entity may submit a predetermined ratio of PDCP SDUs/PDUs to an LWAAP (or WLAN/WLAN MAC) entity when PDCP SDUs at points of time having a predetermined interval.

For example, when an LWA bearer transmitting uplink data through a WLAN radio resource in accordance with assignment by a base station is reconfigured into an LWA bearer transmitting uplink data through a base station (or when an LWA uplink bearer switch transmitting uplink data through a WLAN radio resource is reconfigured into an LWA bearer switch transmitting uplink data through a base station, or when instruction information for changing an uplink transmission path to a base station radio link from a WLAN radio link) and PDCP is accordingly reconfigured, for all SDUs for corresponding PDUs for which only PDUs have been submitted to lower LWAAP layers before reconfiguration, or except for SDUs reported as being successfully transmitted by a PDCP state report, or starting with the first SDU for transmission of corresponding PDUs not recognized by a lower layer, the SDU, if not processed yet by PDCP, the PDU, once it has been processed by PDCP, can be considered as a PDCP available data. Further, the terminal may report this to the MAC entity linked to the base station.

For example, when an LWA bearer transmitting uplink data through a WLAN radio resource in accordance with instruction information of a base station is reconfigured into an LWA bearer transmitting uplink data through a base station (or when an LWA uplink bearer switch transmitting uplink data through a WLAN radio resource is reconfigured into an LWA bearer switch transmitting uplink data through a base station, or when instruction information changing an uplink transmission path to a base station radio link from a WLAN radio link) and PDCP is accordingly reconfigured, for all SDUs for corresponding PDUs for which only PDUs have been submitted to lower LWAAP layers before reconfiguration, or except for SDUs reported as being successfully transmitted by a PDCP state report, or for SDUs for which no PDU has been submitted to lower layers, the SDU itself, if the SDU has not yet been processed by PDCP, the PDU, if the SDU has been processed by PDCP, can be considered as a PDCP available data. Further, the terminal may report this to the MAC entity linked to the base station.

As described above, the present disclosure provides a method being able to efficiently use an available data for transmission for MAC buffer state reporting for an LWA bearer configured to transmit uplink data through a WLAN radio resource, whereby it is possible to efficiently use radio resources.

Processing of Available Data for Uplink Bearer Split Transmission

In order to process an available data for transmission for an uplink bearer split, the following embodiments can be used independently or combined/partially combined.

1) Method of Reporting all PDCP Available Data to MAC Entity

When an uplink bearer split is configured, a terminal may report available data for transmission to an MAC entity (or an MAC entity configured in a Master Cell Group (MCG) or an MAC entity configured in a base station cell group, hereafter, referred to as MAC entity for the convenience of description) as all PDCP available data.

For example, when an uplink bearer split is configured, a terminal may always report PDCP available data to an MAC entity.

For MAC buffer state reporting, a terminal should consider PDCP control PDUs and the followings as the available data for transmission in a PDCP layer.

For SDUs for which no PDU has been submitted to lower layers
- the SDU itself, if the SDU has not yet been processed by PDCP
- the PDU, if the SDU has been processed by PDCP That is, when an uplink bearer split is configured, a terminal may report a PDCP available data amount to an MAC entity.

IEEE 802.11 WLAN is commonly used at present and does not request a scheduling function or does not request data submission in WLAN MAC to a higher layer. Accordingly, when PDCP SDUs are received and not a half or more of a PDCP SN space is not used (by PDCP PDUs), the PDCP PDUs may be directly transmitted to a lower layer (e.g., an LWAAP entity). For example, PDCP PDU(s) may be submitted even without a request by a lower layer. PDCP SN is linked to PDCP SDUs for over a half of the PDCP SN space, HFN desynchronization may occur. Accordingly, within a half of the PDCP SN space (when PDCP SDUs/PDUs linked to PDCP SN in PDCP buffer does not exceed a half of the PDCP SN space), a (transmitting) PDCP entity can submit PDCP PDUs to an LWAAP (or WLAN/WLAN MAC) entity after performing a PDCP processing process on the PDCP SDUs of a predetermined ratio when PDCP SDUs are received. To this end, a base station may include a split ratio in DRB configuration information included in an RRC reconfiguration message such that a split ratio for uplink data transmitted through a base station radio resource can be semi-statically changed. Alternatively, a base station may assign a split ratio to a terminal through an MAC control element in order to quickly switch the split ratio.

For example, a PDCP entity may submit PDCP PDUs to a related RLC entity configured for a base station by a request (e.g., uplink scheduling grant) from a lower layer linked to the base station. If the amount requested by a lower layer linked to the base station is smaller than a predetermined ratio and accumulated in a PDCP buffer, this may be submitted to an LWAAP (or WLAN/WLAN MAC) entity, or PDCP PDUs may be submitted to a related RLC entity configured for a base station in accordance with a request from a lower layer after waiting for a request from the lower layer linked to the base station for a predetermined time. In this case, after a predetermined time passes, this may be submitted to an LWAAP (or WLAN/WLAN MAC) entity.

Alternatively, the PDCP entity may perform a PDCP processing process on PDCP SDUs of a predetermined ratio (e.g., a split ratio (%) of 100%–LWAAP) and then submit the PDCP SDUs to a related RLC entity configured for a base station in response to a request from a lower layer linked to a base station.

Alternatively, within a half of the PDCP SN space (when PDCP SDUs/PDUs related to PDCP SN in PDCP buffer does not exceed a half of the PDCP SN space), a (transmitting) PDCP entity can immediately submit PDCP PDUs to a linked RLC entity configured for a base station after performing a PDCP processing process on the PDCP SDUs of a predetermined ratio (e.g., a split ratio (%) of 100%–LWAAP) when PDCP SDUs are received.

The base station may transmit information for reporting this to the terminal. Alternatively, it is possible to transmit information for reporting configuration information linked to this operation to a terminal.

As described above, since when an uplink bearer split is configured, a terminal can immediately process PDCP SDUs/PDUs to transmit through a WLAN radio resource, the terminal may report the PDCP available data buffered to a PDCP buffer to the MAC entity configured for the base station.

2) Method of Reporting Available Data of PDCP Control PDUs to MAC Entity

If, for an LWA bearer, a base station is configured to transmit a PDCP control PDU (e.g., a PDCP status report or an LWA status report) through a base station radio resource, it is required to report available data for the PDCP control PDU even though a base station is set to include an uplink bearer switch and to transmit an uplink data through a WLAN radio resource.

Even though the base station is set to include an uplink bearer switch and to transmit an uplink data through a WLAN radio resource, a terminal may report the available data amount for the PDCP control PDUs to an MAC entity configured in link to the base station.

When an uplink bearer split is configured, if a base station if configured to transmit a PDCP control PDU (e.g., a PDCP status report or an LWA status report) through a base station radio resource, a terminal should include PDCP control PDU(s) to the available data for transmission to an MAC entity configured in link to the base station.

3) Method of Reporting Available Data in Consideration of Split Ratio Assigned by Base Station Typical IEEE 802.11 WLAN does not request a scheduling function or does not request data submission in WLAN MAC to a higher layer. Accordingly, when PDCP SDUs are received and not a half or more of a PDCP SN space is not used (by PDCP PDUs), the PDCP PDUs may be immediately transmitted to a lower layer (e.g., an LWAAP entity). PDCP SN is linked to PDCP SDUs for over a half of the PDCP SN space, HFN desynchronization may occur. Accordingly, within a half of the PDCP SN space (when PDCP SDUs/PDUs related to PDCP SN in PDCP buffer does not exceed a half of the PDCP SN space), a (transmitting) PDCP entity may submit PDCP PDUs to an LWAAP (or WLAN/WLAN MAC) entity after performing a PDCP processing process on the PDCP SDUs of a predetermined ratio when PDCP SDUs are received. To this end, a base station may include a split ratio in DRB configuration information included in an RRC reconfiguration message in order to semi-statically change a split ratio transmitted to the base station. Alternatively, a base station may transmit information on a split ratio to a terminal through an MAC control element in order to quick switch the split ratio.

For example, a PDCP entity may submit PDCP PDUs to an RLC entity configured in link to the base station in response to a request from a lower layer linked with the base station. If the amount requested by a lower layer related to the base station is smaller than a predetermined ratio and accumulated in a PDCP buffer, this may be submitted to an LWAAP (or WLAN/WLAN MAC) entity, or PDCP PDUs may be submitted to an RLC entity configured in link to a base station in accordance with a request from a lower layer after waiting for a request from the lower layer related to the base station for a predetermined time. After a predetermined time passes, this may be submitted to an LWAAP (or WLAN/WLAN MAC) entity.

Alternatively, the PDCP entity may perform a PDCP processing process on PDCP SDUs of a predetermined ratio (e.g., a split ratio (%) of 100%−LWAAP) and then immediately submit the PDCP PDUs to an RLC entity configured in link to a base station in response to a request from a lower layer linked to a base station.

Alternatively, within a half of the PDCP SN space (when PDCP SDUs/PDUs related to PDCP SN in PDCP buffer does not exceed a half of the PDCP SN space), a (transmitting) PDCP entity can (immediately) submit PDCP PDUs to a linked RLC entity configured for a base station after performing a PDCP processing process on the PDCP SDUs of a predetermined ratio (e.g., a split ratio (%) of 100%−LWAAP) when PDCP SDUs are received.

Alternatively, when PDCP SDUs are received and not a half or more of a PDCP SN space is not used (by PDCP PDUs), the PDCP PDUs may be transmitted to a lower layer with a predetermined interval (time period).

The base station may transmit information for reporting this to the terminal. Alternatively, it is possible to transmit information for instructing configuration information linked to this operation to a terminal.

As described, when an uplink split bearer is configured, a base station determines a ratio for split transmission by a terminal through a base station and a WLAN radio resource (from the PDCP) and reports the ratio to the terminal. The terminal may split and transmit data from the PDCP on the basis of the ratio.

For example, the base station may determine the split ratio in consideration of any one or more information of the radio quality of a base station, a base station load, UE-capability information, a bearer QoS parameter value to be configured in a terminal, a WLAN radio quality, a BSS load, WLAN band information, a WLAN Backhaul rate, Channel Utilization, a station count, flow control feedback on an Xw interface (Highest successfully delivered Xw-U Sequence Number, Desired buffer size for E-RAB, Minimum desired buffer size for the UE, Number of lost Xw-U Sequence Number ranges reported, Start of lost Xw-U Sequence Number range, and End of lost Xw-U Sequence Number range), and a PDCP status report and an LWA status report (FMS PDCP SN of the first missing PDCP SDU, HRW PDCP SN of the PDCP SDU received on WLAN with highest associated PDCP COUNT value, NMP Number of Missing PDCP PDUs with PDCP SNs below HRW starting from and including FMS) from a terminal.

When the base station transmits information on the split ratio to the terminal, the terminal may transmit a PDCP available data to the MAC entity in consideration of the split ratio. For example, it is possible to inform of the MAC entity a result of multiplying a split ratio by one of the PDCP available data according to an embodiment. Alternatively, it is possible to reporting a result of multiplying a split ratio by the PDCP available data to the MAC entity.

4) Method of Indicating Only PDC PDU to be Submitted to Base Station as Available Data Typical IEEE 802.11 WLAN does not request a scheduling function or does not request data submission in WLAN MAC to a higher layer. Accordingly, when PDCP SDUs are received and not a half or more of a PDCP SN space is not used (by PDCP PDUs), the PDCP PDUs may be immediately transmitted to a lower layer (e.g., an LWAAP entity). PDCP SN is linked to PDCP SDUs for over a half of the PDCP SN space, HFN desynchronization may occur. Accordingly, within a half of the PDCP SN space (when PDCP SDUs/PDUs related to PDCP SN in PDCP buffer does not exceed a half of the PDCP SN space), a (transmitting) PDCP entity may submit PDCP PDUs to an LWAAP (or WLAN/WLAN MAC) entity after performing a PDCP processing process on the PDCP SDUs of a predetermined ratio when PDCP SDUs are received. To this end, a base station may include a split ratio in DRB configuration information included in an RRC reconfiguration message in order to semi-statically changing a split ratio transmitted to the base station. Alternatively, a base station may inform of a terminal a split ratio through an MAC control element in order to quickly switch the split ratio.

For example, within a half of the PDCP SN space (when PDCP SDUs/PDUs related to PDCP SN in PDCP buffer does not exceed a half of the PDCP SN space), a (transmitting) PDCP entity may (immediately) submit PDCP PDUs to a linked RLC entity configured for a base station after performing a PDCP processing process on the PDCP SDUs of a predetermined ratio (e.g., a split ratio (%) of 100%−LWAAP) when PDCP SDUs are received.

To this end, a terminal in which an LWA bearer (or an uplink bearer split) is configured in a PDCP entity may perform a routing function for the corresponding LWA bearer or uplink bearer split before attaching a PDCP header. For example, it is possible to perform routing function for the LWA bearer or the uplink bearer split before performing a sequence number in the PDCP entity. Alternatively, it is possible to perform routing function for the LWA bearer or the uplink bearer split before performing header compression after attaching a sequence number in the PDCP entity. Alternatively, it is possible to perform routing function for the LWA bearer or the uplink bearer split before performing Integrity protection/Ciphering after attaching a sequence number and performing header compression in the PDCP entity. Alternatively, it is possible to perform routing function for the LWA bearer or the uplink bearer split before attaching a PDCP header after attaching a sequence number, performing header compression, and performing Integrity protection/Ciphering in the PDCP entity.

Accordingly, the terminal can distinguish PDCP PDUs to submit to the MAC entity configured for a base station.

When an uplink bearer split is configured, a terminal may report the PDCP available data to an MAC entity.

For MAC buffer state reporting, a terminal should consider (PDCP control PDUs and) the followings as the available data for transmission in a PDCP layer.

for SDUs for which no PDU has been submitted to lower layers
  the SDU itself, if the SDU has not yet been processed by PDCP
  the PDU if the SDU to be submitted to the MAC entity configured for MCG has been processed by PDCP That is, when an uplink bearer split is configured, a terminal may report available data for PDCP SDUs/PDUs to an MAC entity.

5) Method for i) Informing of a Terminal, by a Base Station, a Method for Calculating an Uplink Split Processing Ratio Through the Base Station, ii) Calculating, by the Terminal, the Uplink Split Processing Ration Based on the Informed Method, and iii) Reporting PDCP Available Data as much as the Calculated Uplink Split Processing Ratio to MAC Entity For example, a base station may enable a terminal to calculate a split ration by notifying of the terminal a method for calculating a split ratio using one or more information including the radio quality of a base station, a base station load, UE-capability information, a bearer QoS parameter value to be configured in a terminal, a WLAN radio quality, a BSS load, WLAN band information, a WLAN Backhaul rate, Channel Utilization, a station count, flow control feedback on an Xw interface (Highest successfully delivered Xw-U Sequence Number, Desired buffer size for E-RAB, Minimum desired buffer size for the UE, Number of lost Xw-U Sequence Number ranges reported, Start of lost Xw-U Sequence Number range, and End of lost Xw-U Sequence Number range), and a PDCP/LWA status report from a terminal.

The terminal may determine a PDCP available data by considering the split ratio to the existing PDCP available data and report the determined PDCP available data to an MAC entity. For example, it is possible to inform of the MAC entity a result of multiplying a split ratio by one of PDCP available data. Alternatively, it is possible to inform of the MAC entity a result of multiplying the split ratio by the PDCP available data.

To this end, a base station may include information on a method of calculating a split ratio in DRB configuration information included in an RRC reconfiguration message in order to semi-statically changing the method. Alternatively, a base station may inform of a terminal the information on the method of calculating a split ratio through an MAC control element in order to quickly switch the method.

6) Method of Transmitting a Threshold Value to Base Station and Transmitting Available Data in Consideration of the Threshold Value As described with reference FIGS. 6 and 7, when an uplink bearer split (or an LWA bearer) is configured, if a terminal reports a PDCP available data to an MAC entity and performs buffer status reporting from the MAC entity to a base station, the base station may be aware of the PDCP available data of the terminal in which an uplink bearer is configured.

When the uplink data is very large, when the terminal is configured to use a high-speed WLAN technology, when the terminal includes an uplink bearer for supporting a high-speed WLAN, or when the terminal assigns UE-capability that can support a high-speed WLAN, it may be efficient for the terminal to transmit data through only a WLAN radio resource for uplink data over a specific threshold value. In a high-speed WLAN, it is possible to achieve an effective data transmission rate by configuring an uplink switch and transmitting data only through a WLAN radio resource rather than performing reordering in accordance with an uplink split.

In detail, for example, when the uplink threshold value is configured by configuration information transmitted from the base station, and when the available data for transmission is larger than or equal to the uplink threshold value, the terminal may transmit uplink data in response to a request from an MAC entity or an LWAAP (or WLAN/WLAN MAC) entity configured for the base station.

Alternatively, when the uplink threshold value is configured by configuration information transmitted from the base station, and when the available data for transmission is smaller than the uplink threshold value, the terminal does not need to transmit data through the uplink bearer split. In this case, when path instruction information for instructing a transmission path instructs to use a WLAN radio resource, the terminal may not report available data to the MAC entity configured for a base station. Accordingly, a transmitting PDCP entity may submit PDCP PDUs to the LWAAP (or WLAN/WLAN MAC) entity.

7) Method of Instructing, by a Base Station, a Time Interval for Reporting Uplink Data Amount and Method of Reporting Uplink Data Amount As described, the method of processing uplink data by a base station is different from the method of processing uplink data on the basis of IEEE 802.11 WLAN. Accordingly, a base station may determine and transmit, to a terminal, a time interval for reporting PDCP uplink data amount as available data to an MAC entity configured for the base station.

8) Method of Instructing, by a Base Station, a Time Interval for Reporting Uplink Data Amount and Method of Reporting Uplink Data Amount As described above, the method of processing uplink data by a base station is different from the method of processing uplink data on the basis of IEEE 802.11 WLAN. Accordingly, a base station may determine and transmit, to a terminal, a time interval for reporting PDCP uplink data amount as available data to an MAC entity configured for the base station (or an MAC entity configured for a base station at a transmission chance for receiving uplink scheduling by a lower layer or a base station).

The base station may transmit information for reporting this to the terminal. Alternatively, it is possible to transmit information for reporting configuration information linked to this operation to a terminal.

9) Method of a Base Station for Instructing an Uplink Transmission Path and Reporting Available Data Amount in Consideration of Uplink Transmission Path In case of configuring an uplink bearer split for an LWA bearer, if a terminal reports a PDCP available data amount to an MAC entity, and if the MAC entity reports a buffer status to the a base station, the base station may be aware of the PDCP available data of the terminal including an uplink bearer. When instructing an uplink transmission path for transmission as a default for an LWA bearer including an uplink bearer split (or an uplink transmission path for transmission when the available data is less than a specific threshold value, an uplink transmission path for transmission under a specific condition, or an uplink transmission path for transmission when a specific condition is not satisfied), the terminal may reporting an available data amount to an LWAAP entity when an uplink for transmission as a default (or the uplink transmission path for transmission when the available data is less than a specific threshold value, the uplink transmission path for transmission under a specific condition, or the uplink transmission path for transmission when a specific condition is not satisfied) is a transmission path through a WLAN radio resource. A (transmitting) PDCP entity may submit PDCP PDUs to a linked AM RLC entity.

As described, the present disclosure provides a method for efficiently providing an available data amount to report a MAC buffer state for an LWA bearer configured to transmit uplink data through a WLAN radio resource in accordance with embodiments. Accordingly, it is possible to efficiently use radio resources.

Figure 8:
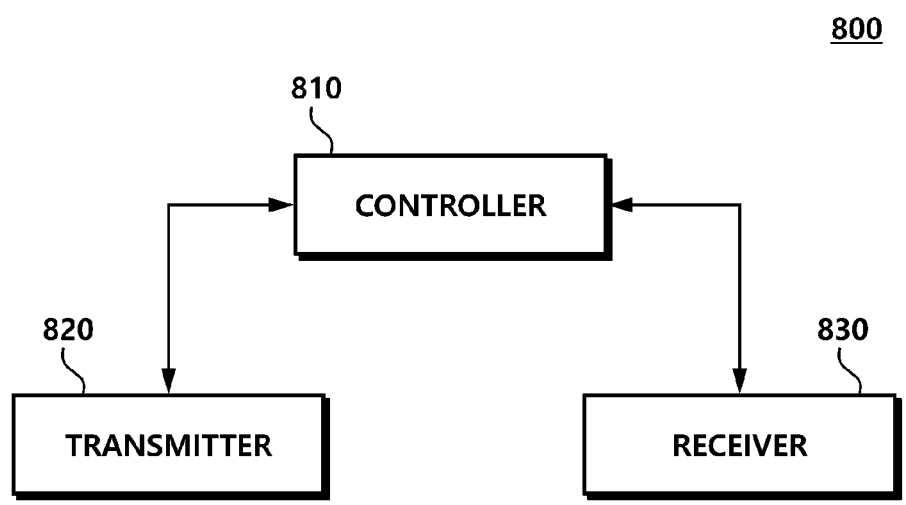
FIG. 8 is a diagram showing a terminal according to an embodiment.

FIG. 8 is a diagram showing a terminal according to an embodiment.

Referring to FIG. 8, a terminal 800 for processing uplink data may include a receiver 830, a controller 810, and a transmitter 802. The receive 830 may receive, from a base station, configuration information for indicating an uplink transmission configuration for an LWA bearer. The controller 810 may determine an uplink transmission path for the LWA bearer based on the received configuration information and uplink transmittable data amount. The transmitter 820 may transmit uplink data to the base station in accordance with the determined uplink transmission path. As described above, the LWA bearer may be a bearer configured to transmit uplink data using at least one of a base station radio resource and a WLAN radio resource.

For example, the configuration information may include at least one of path instruction information for indicating an uplink transmission path of an LWA bearer and a threshold value for an uplink transmission path. That is, the configuration information may include path instruction information for indicating an uplink transmission path for an LWA bearer that is set to transmit uplink data using a WLAN radio resource and a threshold value of an uplink transmission path that may be used for the terminal 800 to determine an uplink transmission path. The terminal 800 may receive the configuration information from the base station. For example, the configuration information may be received through an RRC message. Alternatively, the configuration information may be received together with PDCP configuration information transmitted from the base station.

In detail, the path instruction information includes an information about whether the terminal should transmit a PDCP PDU through an LWAAP entity configured in the terminal 800 for an LWA bearer. The threshold value may be used to determine an uplink data split operation for an LWA DRB.

For example, the controller 810 determines an uplink transmission path for the LWA bearer using a result of comparing the uplink transmission path and the received configuration information.

In detail, for example, the controller 810 determines an uplink transmission path by checking the path instruction information included in the configuration information when the uplink transmittable data amount is less than the threshold value. If the path instruction information has an instruction to transmit uplink data using a WLAN radio resource, the controller 810 transmits the uplink data of the LWA bearer to the base station using the WLAN radio resource. In this case, the controller 810 controls the terminal to set the transmittable data amount as 0 and report it to a MAC entity configured in relation to the base station. Unlikely, when the path instruction information does not have an instruction to transmit uplink data using a WLAN radio resource, the controller 810 controls the terminal to transmit the uplink data of the LWA bearer to the base station using the base station radio resource. Further, the controller 810 controls the terminal to transmit the available data to an MAC entity configured in link to the base station.

Unlikely, when the uplink transmittable data amount is greater than the threshold value, the controller 810 controls the terminal to transmit uplink data to the base station using a base station radio resource or a WLAN radio resource, depending on a request from a lower layer. For example, the controller 810 controls the terminal to transmit the uplink data to the base station using a base station radio resource or a WLAN radio resource, depending on a request from an AM RLC entity that is a lower layer of an PDCP entity, or an LWAAP entity. In this case, the terminal 800 may transmit the uplink data to the base station using both of the base station radio resource and the WLAN radio resource.

As described above, the controller 810 may primarily compare the threshold value included in the configuration information with the transmittable data amount of the PDCP, additionally check path instruction information, and determine an uplink data transmission path for the LWA bearer when the transmittable data amount is less than the threshold value. Further, the controller 810 may determine an uplink data transmission path for the LWA bearer in accordance with a request from a lower layer without checking path instruction information when the transmittable data amount is greater than the threshold value.

Further, the controller 810 controls the general operation of the terminal 800 in the method of transmitting uplink data for an LWA bearer according to the embodiments described above, using a WLAN radio resource.

The receiver 830 receives downlink control information, data, and messages from a base station through a corresponding channel. The transmitter 820 transmits uplink control information, data, and messages to a base station through a corresponding channel.

Figure 9:
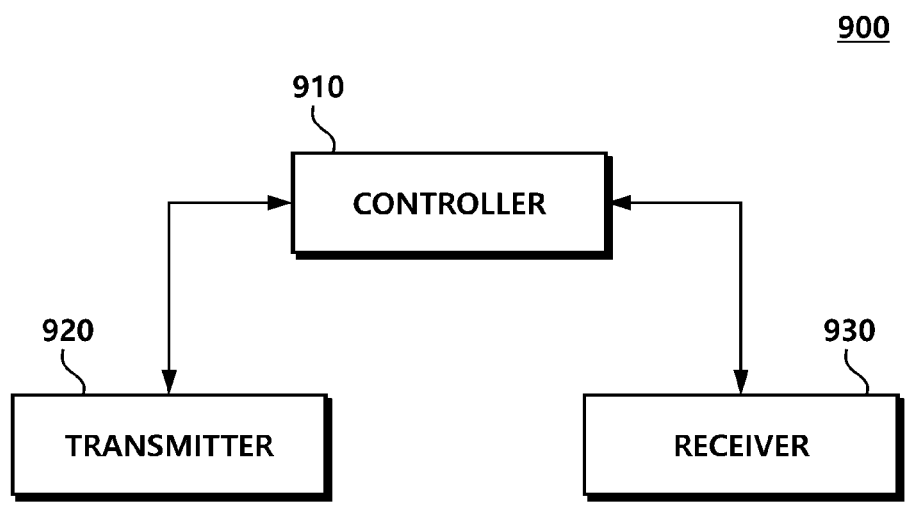
FIG. 9 is a diagram showing a base station according to an embodiment.

FIG. 9 is a diagram showing a base station according to an embodiment.

Referring to FIG. 9, a base station 900 may include a transmitter 920, a receiver 930, and a controller 910. The transmitter 920 may transmit configuration information for indicating uplink transmission configuration for an LWA bearer to a terminal. The receiver 930 may receive uplink data through an uplink transmission path for the LWA bearer determined on the basis of an uplink transmittable data amount of the terminal and the configuration information.

As described above, the configuration information may include at least one of path instruction information for indicating an uplink transmission path of an LWA bearer and a threshold value of an uplink transmission path. In detail, the path instruction information includes information about whether a terminal should transmit a PDCP PDU through an LWAAP entity configured in the terminal for an LWA bearer. The threshold value may be used to determine an uplink data split operation for an LWA DRB.

For example, the transmitter 920 may transmit configuration information through an RRC message. Alternatively, the transmitter 920 may transmit configuration together with PDCP configuration information.

The terminal determines an uplink transmission path for the LWA bearer using a result of comparing the received threshold value and the received configuration information.

In detail, for example, the terminal determines an uplink transmission path by checking path instruction information included in the configuration information when the uplink transmissible data amount is less than the threshold value. If the path instruction information has an instruction to transmit uplink data using a WLAN radio resource, the terminal transmits the uplink data of the LWA bearer to the base station using the WLAN radio resource. In this case, the terminal sets the transmissible data amount as 0 and reports it to a MAC entity configured in relation to the base station. Unlikely, if the path instruction information does not have an instruction to transmit uplink data using a WLAN radio resource, the terminal transmits the uplink data of the LWA bearer to the base station using the base station radio resource. Further, the terminal transmits the transmissible data amount to the MAC entity configured in relation to the base station.

Unlikely, when the uplink transmittable data amount is greater than the threshold value, the terminal transmits uplink data to the base station using a base station radio resource or a WLAN radio resource, depending on a request from a lower layer. For example, the terminal transmits the uplink data to the base station using a base station radio resource or a WLAN radio resource, depending on a request from an AM RLC entity that is a lower layer of an PDCP entity, or an LWAAP entity. In this case, the terminal may transmit the uplink data to the base station using both of the base station radio resource and the WLAN radio resource.

As described above, the terminal may primarily compare the threshold value included in the configuration information with the transmittable data amount of the PDCP entity, additionally check path instruction information, and determine an uplink data transmission path for the LWA bearer when the transmittable data amount is less than the threshold value. Further, the terminal may determine an uplink data transmission path for the LWA bearer in accordance with a request from a lower layer without checking path instruction information when the transmittable data amount is greater than the threshold value.

The controller 910 controls the general operation of the base station 900 when receiving uplink data for the LWA bearer of the terminal using a WLAN radio resource according to the embodiments described above.

Further, the transmitter 920 and the receiver 930 are used to transmit/receive signals or messages, and data for achieving the method and system of the present disclosure to/from a terminal.

The standard details or standard documents mentioned in the above embodiments are omitted for the simplicity of the description of the specification, and constitute a part of the present specification. Therefore, when a part of the contents of the standard details and the standard documents is added to the present specifications or is disclosed in the claims, it should be construed as falling within the scope of the present disclosure.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims. Therefore, exemplary aspects of the present disclosure have not been described for limiting purposes. The scope of the present disclosure shall be construed on the basis of the accompanying claims in such a manner that all of the technical ideas included within the scope equivalent to the claims belong to the present disclosure.

The invention claimed is:

1. A method of processing uplink data by a terminal, the method comprising:
    receiving configuration information for indicating uplink transmission configuration for an LTE-WLAN Aggregation (LWA) bearer from a base station;
    determining an uplink transmission path for the LWA bearer based on the configuration information and a transmittable data amount; and
    transmitting uplink data to the base station through the determined uplink transmission path,
    wherein the LWA bearer is a bearer configured to transmit the uplink data using at least one of a base station radio resource and a Wireless Local Area Network (WLAN) radio resource, and
    wherein the determining of a transmission path comprises setting the uplink transmittable data amount as 0 and reporting to an MAC entity set to use the base station resource when the uplink transmittable data is less than the threshold value, and when the path assignment information indicates the WLAN radio resource to use for uplink data transmission.

2. The method of claim 1, wherein the configuration information includes at least one of path assignment information for indicating an uplink transmission path of the LWA bearer and a threshold value.

3. The method of claim 2, wherein the determining of a transmission path comprises determining the uplink transmission path in accordance with a result of comparing the uplink transmittable data amount with the threshold value.

4. The method of claim 2, wherein the determining of a transmission path comprises determining the uplink transmission path based on the path assignment information when the uplink transmittable data amount is less than the threshold value.

5. The method of claim 1, wherein the determining of a transmission path comprises reporting the uplink transmittable data amount to a Medium Access Control (MAC) entity set to use the base station radio resource when the uplink transmittable data is greater than the threshold value.

6. A method of receiving uplink data by a base station, the method comprising:
    transmitting configuration information for indicating uplink transmission configuration for an LTE-WLAN Aggregation (LWA) bearer to a terminal; and
    receiving uplink data through an uplink transmission path for the LWA bearer, where the uplink transmission path is determined based on the configuration information and an uplink transmittable data amount of the terminal,
    wherein the configuration information includes at least one of path assignment information for indicating the uplink transmission path of the LWA bearer and a threshold value, and
    the LWA bearer is a bearer configured to receive the uplink data using at least one of a base station radio resource and a Wireless Local Area Network (WLAN) radio resource, and
    wherein the terminal is configured to determine the uplink transmission path to set the uplink transmittable data amount as 0 and report to an MAC entity set to use the base station resource when the uplink transmittable data amount is less than the threshold value and when the path assignment information indicates the WLAN radio resource to use for uplink data transmission.

7. The method of claim 6, wherein the terminal is configured to determine the uplink transmission path in accordance with a result of comparing the uplink transmittable data amount with the threshold value.

8. The method of claim 6, wherein the terminal is configured to determine the uplink transmission path based on the path assignment information when the uplink transmittable data amount is less than the threshold value.

9. The method of claim 6, wherein the terminal is configured to determine the uplink transmission path to use the base station radio resource or the WLAN radio resource when the uplink transmittable data amount is greater than the threshold value.

10. A terminal for processing uplink data, the terminal comprising:
    a receiver configured to receive configuration information for indicating uplink transmission configuration for an LTE-WLAN Aggregation (LWA) bearer from a base station;

a controller configured to determine an uplink transmission path for the LWA bearer based on the configuration information and a transmittable data amount; and
a transmitter configured to transmit uplink data to the base station through the determined uplink transmission path,
wherein the LWA bearer is a bearer configured to transmit the uplink data using at least one of a base station radio resource and a Wireless Local Area Network (WLAN) radio resource, and
wherein the controller is configured to determine the uplink transmission path to set the uplink transmittable data amount as 0 and report to an MAC entity set to use the base station resource when the uplink transmittable data amount is less than the threshold value and when the path assignment information indicates the WLAN radio resource to use for uplink data transmission.

11. The terminal of claim 10, wherein the configuration information includes at least one of path assignment information for indicating an uplink transmission path of the LWA bearer and a threshold value.

12. The terminal of claim 11, wherein the controller is configured to determine the uplink transmission path in accordance with a result of comparing the uplink transmittable data amount with the threshold value.

13. The terminal of claim 11, wherein the controller is configured to determine the uplink transmission path based on the path assignment information when the uplink transmittable data amount is less than the threshold value.

14. The terminal of claim 10, wherein the controller is configured to determine the uplink transmission path to transmit the uplink transmittable data to a Medium Access Control (MAC) entity set to use the base station radio resource when the uplink transmittable data amount is greater than the threshold value.

* * * * *